United States Patent
Selwyn

(10) Patent No.: US 9,895,634 B2
(45) Date of Patent: Feb. 20, 2018

(54) STATIC FILTER SCREEN

(71) Applicant: Frederick Philip Selwyn, Bude (GB)

(72) Inventor: Frederick Philip Selwyn, Bude (GB)

(*) Notice: Subject to any disclaimer, the term of this patent is extended or adjusted under 35 U.S.C. 154(b) by 701 days.

(21) Appl. No.: 14/380,202

(22) PCT Filed: Feb. 25, 2013

(86) PCT No.: PCT/GB2013/050454
§ 371 (c)(1),
(2) Date: Aug. 21, 2014

(87) PCT Pub. No.: WO2013/128171
PCT Pub. Date: Sep. 6, 2013

(65) Prior Publication Data
US 2015/0021257 A1   Jan. 22, 2015

(30) Foreign Application Priority Data
Feb. 27, 2012 (GB) .................... 1203332

(51) Int. Cl.
*B01D 29/46* (2006.01)
(52) U.S. Cl.
CPC ................. *B01D 29/46* (2013.01)
(58) Field of Classification Search
None
See application file for complete search history.

(56) References Cited

U.S. PATENT DOCUMENTS

| | | | | |
|---|---|---|---|---|
| 2,283,629 | A | * | 5/1942 | Heftler ................ B21D 28/06 210/492 |
| 2,581,337 | A | | 1/1952 | Lapik |
| 2,702,637 | A | * | 2/1955 | Shepard ............... B01D 24/08 210/434 |
| 4,686,038 | A | | 8/1987 | Arnaud |
| 4,686,041 | A | * | 8/1987 | Van den Berg ...... B01D 29/114 210/335 |
| 4,707,259 | A | * | 11/1987 | Doucet ................ B01D 29/15 210/351 |
| 5,935,424 | A | * | 8/1999 | Dyer .................... B01D 29/15 137/808 |

FOREIGN PATENT DOCUMENTS

| | | | |
|---|---|---|---|
| GB | 336122 | A | 10/1930 |
| GB | 829975 | * | 3/1960 |
| GB | 2201902 | A | 9/1988 |

* cited by examiner

*Primary Examiner* — Thomas M Lithgow
(74) *Attorney, Agent, or Firm* — Galbreath Law Offices, P.C.; John A. Galbreath

(57) ABSTRACT

Stackable screening plates (3) with radial screening apertures (10) are carried on a tubular shaft having an axial key. The plates have a choice of keyways (14, 15) allowing the plates to be stacked in alternate angular positions. Spring tongues (16) formed integrally with the plates provide uniform but adjustable mutual spacing.

11 Claims, 5 Drawing Sheets

US 9,895,634 B2

STATIC FILTER SCREEN

TECHNICAL FIELD OF THE INVENTION

This invention relates to static, non-rotary, filter screens.

BACKGROUND

There are many applications involving gravity feed or forced pumping of fluids that require a system of filtration or screening prior to delivering the fluid to a point of use or to a pumping means. Canister or cartridge filters are widely used where a high degree of filtration is required. These filters are often replaced periodically to ensure continuous effective operation. For initial screening of such fluids, a course mesh or perforated canister is often fitted to the inlet or pipe. Such a screen provides a fixed surface area of screening with a predetermined perforated cross section depending on the particular system requirements. It is therefore necessary to install the correct filter for each individual use.

The present invention seeks to provide a modular filter screen system that is both adjustable in surface area and screening aperture so that it can be used in a wide variety of applications, and can also be easily dissembled for cleaning, maintenance or calibration purposes.

SUMMARY OF THE INVENTION

The present invention proposes a static filter screen characterised by a stack of screening plates each having an array of screening apertures, the plates being mutually spaced and each plate being mutually offset relative to adjacent plates in the stack.

The invention also provides a static filter screen in which the screening plates are angularly offset relative to adjacent screening plates.

The invention also provides a static filter screen in which the angular position of the screening plates is determined by locating means which allow the screening plates to be placed together in two different relative angular positions.

The invention also provides a static filter screen in which the screening apertures are of elongate shape and are arranged radially.

The invention also provides a static filter screen in which in which the screening plates are substantially disc-shaped.

The invention also provides a static filter screen in which the screening plates are carried on a shaft.

The invention also provides a static filter screen in which screening plates are carried on a shaft with an axially-extending key.

The invention also provides a static filter screen in which the screening plates are carried on a shaft which passes through an opening in each screening plate which is provided with two or more keyways.

The invention also provides a static filter screen in which the screening plates are carried on a shaft which is tubular and provided with one or more holes through which fluid may flow.

The invention also provides a static filter screen in which the screening plates are held between a nut which is screw-threaded onto a shaft and flange or other abutment which is fixed with the shaft.

The invention also provides a static filter screen in which the screening plates include projections which engage adjacent screening plates to determine the spacing between the adjacent screening plates.

The invention also provides a static filter screen in which the screening plates include spring projections which allow adjustment of the spacing between the screening plates.

The invention also provides a static filter screen in which screening plates include projections provided with locating means which determine the offset between adjacent screening plates.

The invention also provides a static filter screen in which the screening plates are each formed with at least two lines of weakness which define respective segments which can be removed from the screening plate.

The invention also provides a static filter screen in which the screening plates have segments which have been removed from the screening plates all arranged on one side of the filter screen.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
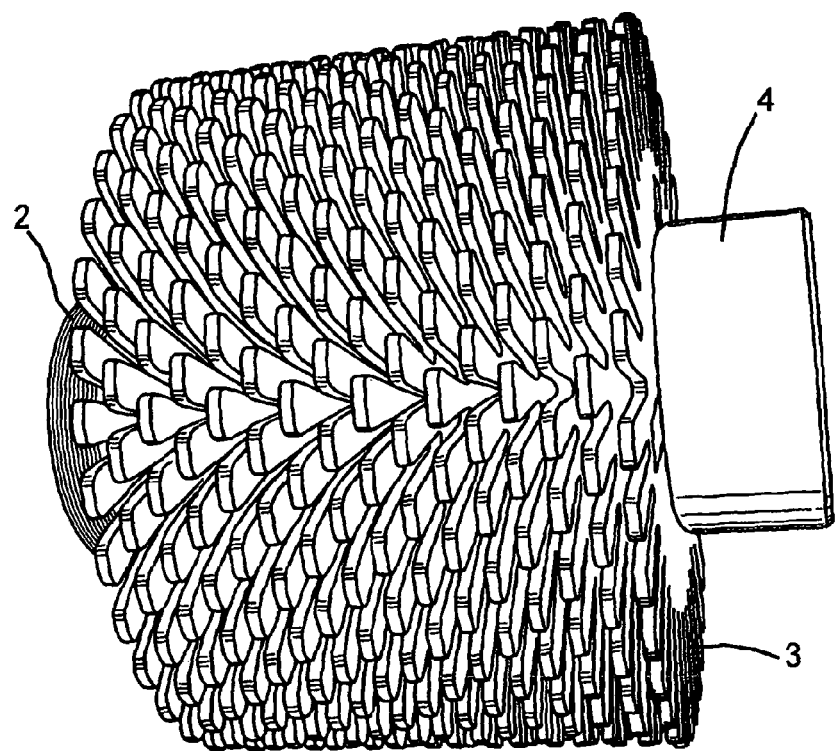
FIG. 1 is a general view of a static filter screen in accordance with the invention.

Referring firstly to FIG. 1, the static filter screen includes a drum or shaft 2 which carries a stack of screening plates 3 held by a screwed cap nut 4. The components may conveniently be formed of injection moulded plastics.

Figure 2:
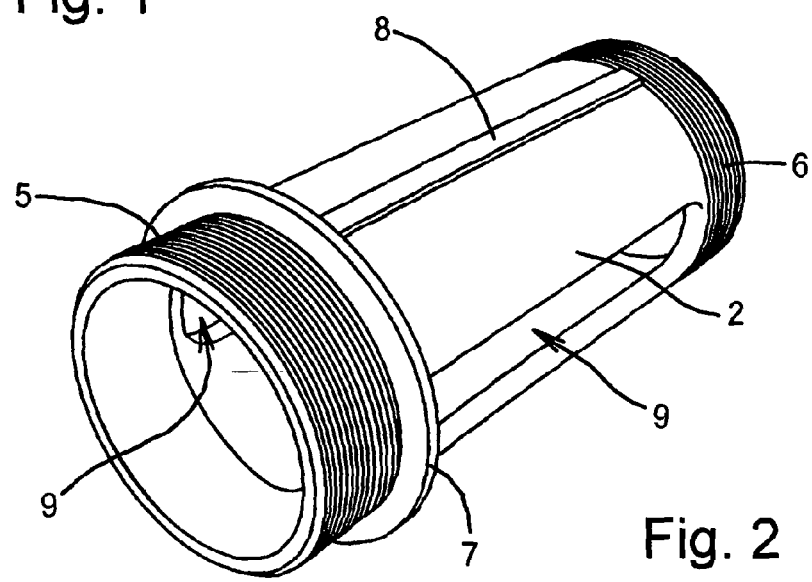
FIG. 2 is a general view of a shaft for use in the filter screen.

As shown in FIG. 2, the shaft 2 is of hollow tubular shape with external screw threaded portions 5 and 6 at opposite ends. One of the threaded portions 5 terminates at an outwardly-extending annular flange 7. Extending between the flange 7 and the opposite threaded portion 6 there is at least one external axially-extending rib or key 8 together with at least one axially-extending slot-shaped hole 9. In this example there is a single key 8 and two diametrically opposed holes 9.

Figure 3:
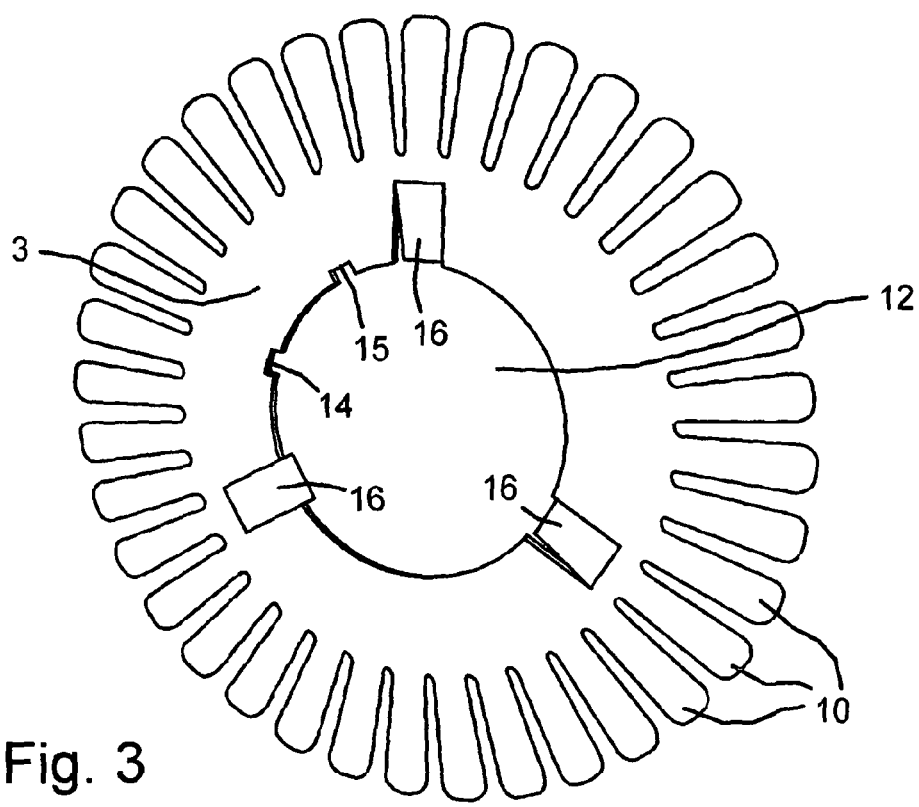
FIG. 3 is a general view of one of the screening plates for use in the filter screen.

The set of screening plates 3 are all identical, making the device easy to assemble and inexpensive to manufacture. As shown in FIG. 3, each plate 3 is disc-shaped with an array of radially-extending peripheral slot-shaped apertures 10 which open at the periphery of the plate. The apertures are all of the same width and length, and are all equally spaced. The plate has a circular central opening 12 which is dimensioned to fit snugly over the shaft 2, with a choice of two angularly-spaced keyways 14, 15 either of which may receive the key 8. Each plate is also provided with integrally-formed spring tongues 16, preferably at least three, which all project to one side of the plate. The spring tongues are equally spaced circumferentially, and are of equal shape and dimensions so that they possess equal spring force. They are also positioned to avoid mutual interference between the tongues when the screening plates 3 are assembled onto the shaft 2.

Figure 4:
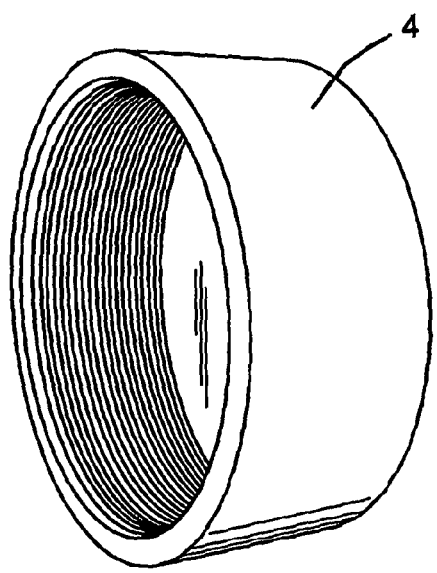
FIG. 4 is a general view of an end cap for use in the filter screen.

By assembling the stack of plates 3 with the key 8 in alternate keyways, the slot apertures 10 in each plate are angularly offset relative to those of adjacent plates such that the slots fall midway between the slots of adjacent plates. One of the end plates 3 abuts the fixed flange 7 while the opposite end plate is retained by the end cap 4 (FIG. 4) which is screwed onto the threaded end portion 6. The spring tongues 16 act to space the plates apart in such a way that the spacing is substantially uniform. Furthermore, by adjusting the number of plates on the shaft and the amount by which the cap 4 is screwed onto the shaft the spacing between the plates can be simply but accurately adjusted to control the amount of screening.

The threaded end 5 may be used as a screw coupler by which the filter screen may be connected into a fluid line. Fluid flows between and through the screening discs 3 before entering the shaft 1 through the holes 9.

Figure 5:
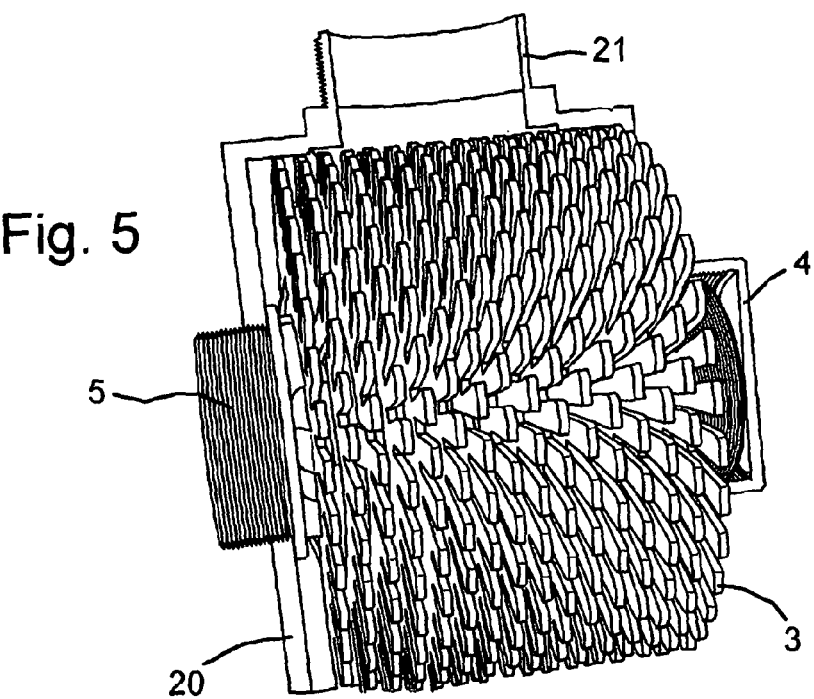
FIG. 5 is a general view of the filter screen which is contained in a housing, shown partially cut away.

As shown in FIG. 5, the filter screen may be mounted in a cylindrical housing 20 formed in two or more parts, supported between the threaded portion 5 and the cap nut 4. One fluid connection is made to the thread 5 and the other may be made to a port 21 in the cylindrical wall of the housing. Suitable O-rings and gaskets may be provided to ensure that no leakage occurs, and that air or other fluids are not drawn into the flow under high differential pressures.

By connecting several enclosed screening units in series it is possible to carry out progressive screening if the disc spacing is progressively reduced in the direction of flow. For example, in a three unit module the first unit may have a disc spacing of X, the next unit may be 0.5X and the final unit 0.1X.

Figure 6:
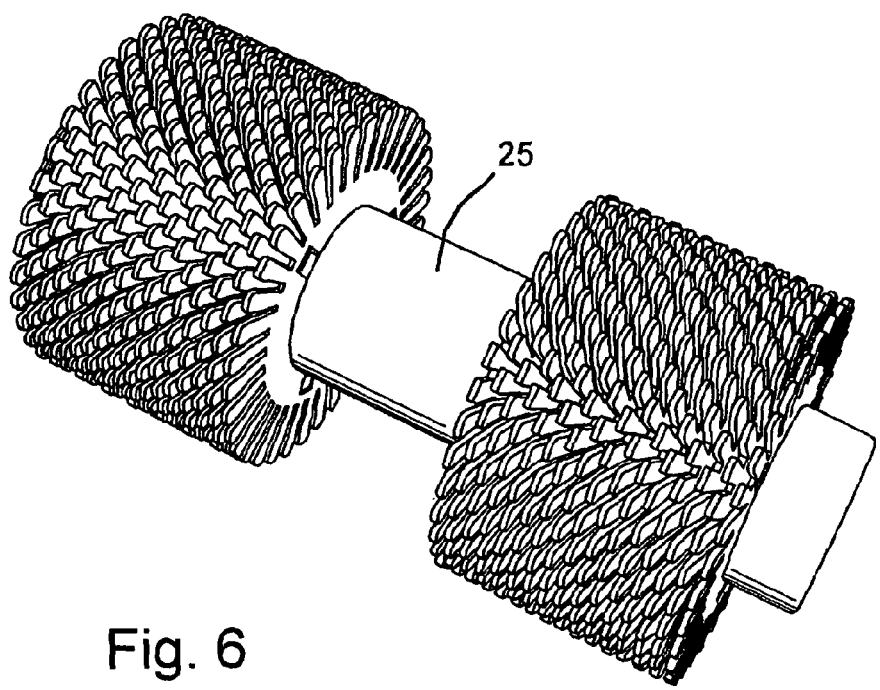
FIG. 6 is a general view showing two filter screens connected together.

To increase the through capacity of a screening system a number of filter screens can be connected together by replacing the cap nut 4 with a screwed-socket straight connector 25, an elbow, U-bend, or any combination thereof, which connect the shaft 2 with one or more further filter screens, as shown in FIG. 6.

Figure 7:
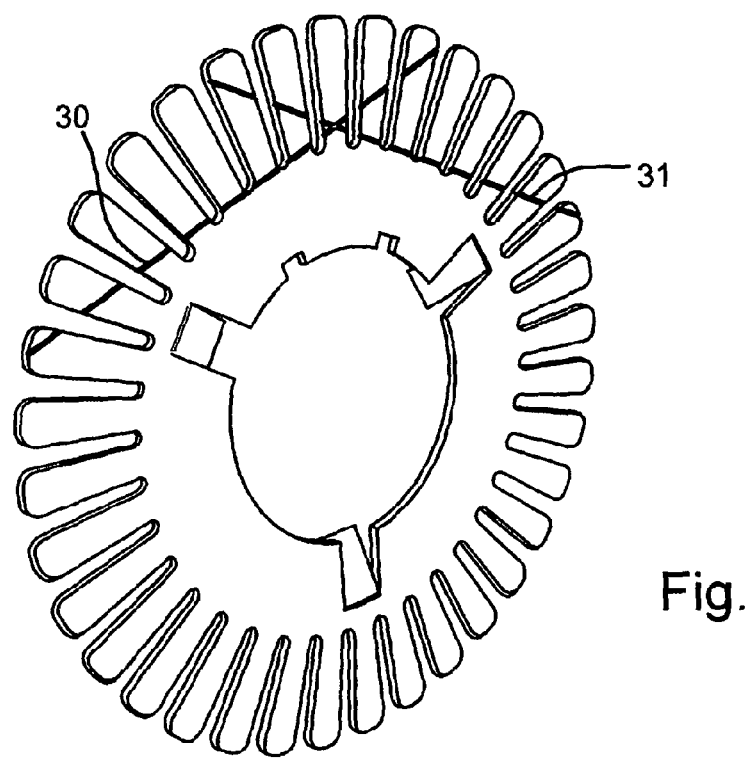
FIG. 7 is a general view of a modified form of the screening plate.
Figure 8:
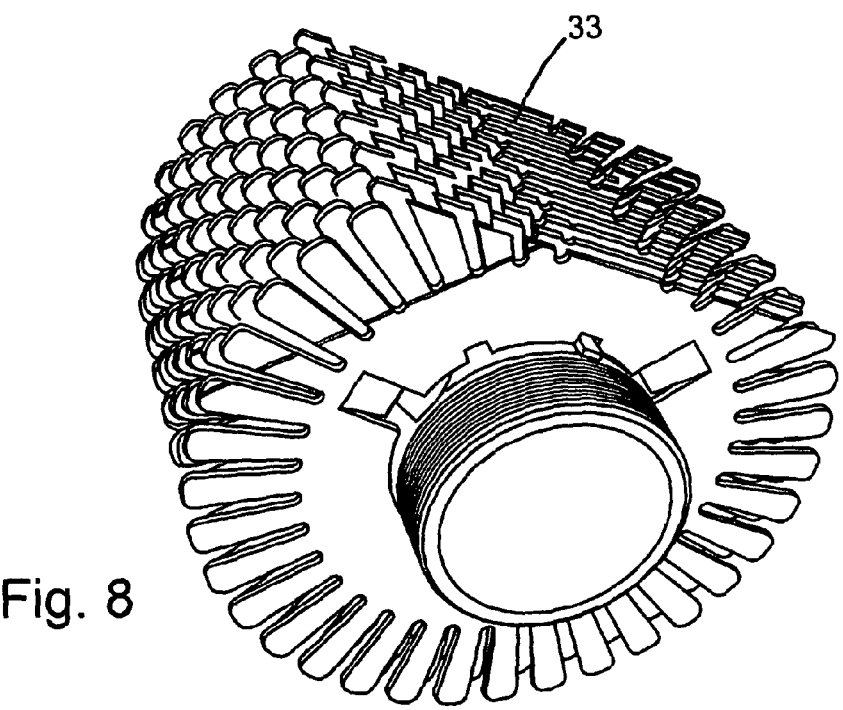
FIG. 8 is a general view of a filter screen using the screening plates of FIG. 7.
Figure 9:
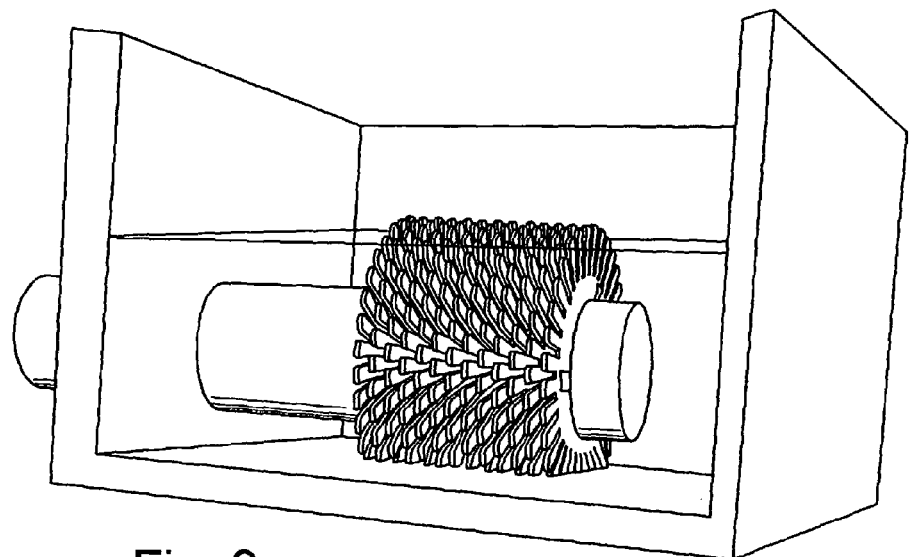
FIG. 9 is a general view showing the filter screen of FIG. 8 in use.

As shown in FIG. 7, the screening discs 3 can also be moulded with at least two grooves 30 and 31 which both extend along a chord of the disc to form intersecting lines of weakness. These lines permit a segment of the disc to be removed by either bending back-and-forth, or cutting along the line which a knife or saw. By removing the segments from alternate discs along alternate lines 30 and 31 the assembled filter screen will have a longitudinally extending flat area 33 (FIG. 8) which allows the unit to sit lower in a pool or sump (FIG. 9) to reduce the risk of air being drawn in when the fluid level is low.

Figure 10:
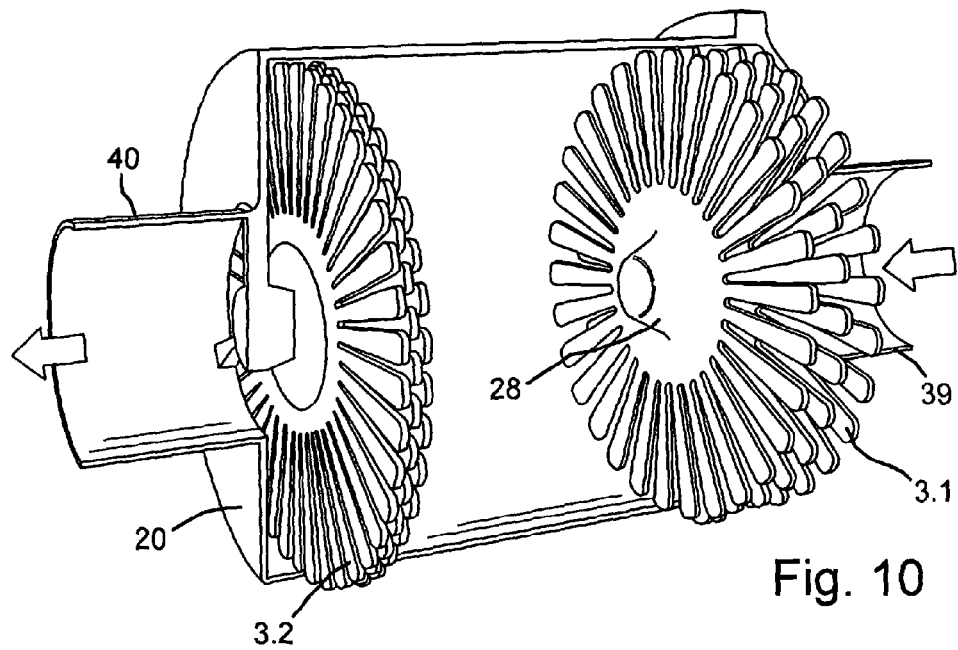
FIG. 10 shows a second embodiment of the filter screen partially cut-away with some of the screening plates omitted for clarity.

FIG. 10 shows another embodiment of the filter screen in which, instead of being assembled on a shaft, the screening discs 3.1 and 3.2 are formed with central bosses 38 which nest with each other and determine the spacing between the discs. The bosses are provided with mating keys and keyways which allow the discs to be assembled in two alternate angular positions. The discs may be stacked within a close-fitting cylindrical housing 20 formed in two or more parts with a fluid inlet 39 and an outlet 40 at opposite ends. Since the shape of the bosses determines the spacing between the discs it is possible to assemble the stack using several different forms of disc which give progressively reduced spacing and finer screening in the direction of the arrows.

Whilst the above description places emphasis on the areas which are believed to be new and addresses specific problems which have been identified, it is intended that the features disclosed herein may be used in any combination which is capable of providing a new and useful advance in the art.

The invention claimed is:

1. A static filter screen characterised by a stack of screening plates (3) each having an array of aperture boundary walls which define screening apertures (10), the plates being mutually spaced and each screening plate being mutually offset relative to adjacent screening plates in the stack, in which all of the aperture boundary walls which define the screening apertures (10) of all the screening plates are of elongate shape, are all of the same width and length, and are arranged radially opening at the periphery of the respective plate, and the screening plates (3) include integral projections (16; 28) which engage adjacent screening plates to determine the spacing between the adjacent screening plates.

2. A static filter screen according to claim 1 in which the screening plates (3) are angularly offset relative to adjacent screening plates.

3. A static filter screen according to claim 2 in which the angular position of the screening plates (3) is determined by locating means (8, 14, 15) which allow the screening plates to be placed together in two different relative angular positions.

4. A static filter screen according to claim 1 in which the screening plates (3) are substantially disc-shaped.

5. A static filter screen according to claim 1 in which the screening plates (3) are carried on a shaft (2).

6. A static filter screen according to claim 5 in which the shaft (2) has an axially-extending key (8).

7. A static filter screen according to claim 6 in which the shaft (2) passes through an opening (12) in each screening plate (3) which is provided with two or more keyways (14, 15) in which the key (8) may locate.

8. A static filter screen according to claim 5 in which the shaft (2) is tubular and provided with one or more holes (9) through which fluid may flow, and said one or more holes (9) open into spaces formed between the screening plates (3).

9. A static filter screen according to claim 5 in which the screening plates (3) are held between a nut (4) which is screw-threaded onto the shaft (2) and flange or other abutment which is fixed (7) with the shaft.

10. A static filter screen characterised by a stack of screening plates (3) each having an array of aperture boundary walls which define screening apertures (10), the plates being mutually spaced and each screening plate being mutually offset relative to adjacent screening plates in the stack, in which the screening plates (3) are each formed with at least two lines of weakness (30, 31) which define respective segments which can be removed from the screening plate.

11. A static filter screen according to claim 10 in which the segments which have been removed from the screening plates are all arranged on one side of the filter screen (33).

\* \* \* \* \*